United States Patent
Zampiello

(10) Patent No.: US 8,213,426 B2
(45) Date of Patent: Jul. 3, 2012

(54) METHOD AND SYSTEM FOR MULTICASTING TARGETED ADVERTISING DATA

(75) Inventor: Geoffrey R. Zampiello, Norwalk, CT (US)

(73) Assignee: AT&T IP I, LP, Atlanta, GA (US)

( * ) Notice: Subject to any disclaimer, the term of this patent is extended or adjusted under 35 U.S.C. 154(b) by 987 days.

(21) Appl. No.: 11/699,752

(22) Filed: Jan. 30, 2007

(65) Prior Publication Data

US 2008/0181225 A1  Jul. 31, 2008

(51) Int. Cl.
*H04L 12/56* (2006.01)

(52) U.S. Cl. .......................................... 370/390; 725/32

(58) Field of Classification Search ................ 725/35, 725/34, 42, 9, 10, 11, 46, 87, 97, 14, 32, 725/115, 116; 370/252, 390, 392, 412
See application file for complete search history.

(56) References Cited

U.S. PATENT DOCUMENTS

| | | | |
|---|---|---|---|
| 6,366,298 B1 | 4/2002 | Haitsuka | |
| 6,615,039 B1 * | 9/2003 | Eldering | 455/418 |
| 7,188,138 B1 * | 3/2007 | Schneider | 709/203 |
| 7,500,258 B1 * | 3/2009 | Eldering | 725/32 |
| 7,809,659 B1 * | 10/2010 | Paiz | 706/20 |
| 2003/0097301 A1 | 5/2003 | Kageyama et al. | |
| 2005/0091111 A1 | 4/2005 | Green et al. | |
| 2005/0149395 A1 | 7/2005 | Henkin et al. | |
| 2005/0283473 A1 * | 12/2005 | Rousso et al. | 707/5 |
| 2006/0150188 A1 * | 7/2006 | Roman et al. | 718/104 |
| 2007/0005334 A1 * | 1/2007 | Salmonsen | 703/26 |
| 2008/0089335 A1 * | 4/2008 | Li et al. | 370/392 |
| 2008/0155589 A1 * | 6/2008 | McKinnon et al. | 725/34 |

FOREIGN PATENT DOCUMENTS

| | | |
|---|---|---|
| EP | 1 523 176 A1 | 4/2005 |
| WO | 0054201 A2 | 9/2000 |
| WO | 0120481 A2 | 3/2001 |
| WO | WO 01/37540 A2 | 5/2001 |
| WO | WO 01/41030 A1 | 6/2001 |
| WO | WO 01/65453 A1 | 9/2001 |
| WO | WO 02/088880 A2 | 11/2002 |
| WO | WO 2005/091111 A1 | 9/2005 |

* cited by examiner

*Primary Examiner* — Man Phan
*Assistant Examiner* — Nourali Mansoury
(74) *Attorney, Agent, or Firm* — G. Michael Roebuck P.C.

(57) ABSTRACT

A method for multicasting targeted advertising data to end user devices is disclosed. In an illustrative embodiment the method includes but is not limited to correlating at a regional internet protocol television (IPTV) server, multicast queue data with web data from web sites visited by each of a plurality of end user devices associated with the regional IPTV server; selecting a subgroup of end user devices from the plurality of end user devices to receive targeted advertising data correlating with a member of the multicast queue data; and multicasting targeted advertising data associated with the member of the multicast queue data to the subgroup of end user devices from the regional IPTV server. A system is also disclosed for multicasting targeted advertising data to end user devices. A data structure is disclosed for storing data used by the system and method.

20 Claims, 9 Drawing Sheets

METHOD AND SYSTEM FOR MULTICASTING TARGETED ADVERTISING DATA

FIELD OF THE DISCLOSURE

The present disclosure relates to a system and method for multicasting targeted advertising to a group of end user devices.

BACKGROUND

Advertisers can potentially save advertising dollars by selecting who will receive their advertisements rather than indiscriminately broadcasting their advertisements to a general population of recipients. Thus, only those individuals selected by an advertiser receive the targeted advertisement in hope that the targeted recipients will be more responsive on a per capita basis than a general broadcast population. Advertisement distributors and providers that enable such an advertising model (e.g. Internet portals, television providers, access network providers) can correspondingly increase their revenue per advertisement impression by providing targeted advertising options for advertisers.

Targeted advertisements have historically been sent to targeted recipients so that advertisers reach only those advertising recipients who are deemed by the advertiser as most likely to be responsive to their advertisements.

DETAILED DESCRIPTION

Figure 1:
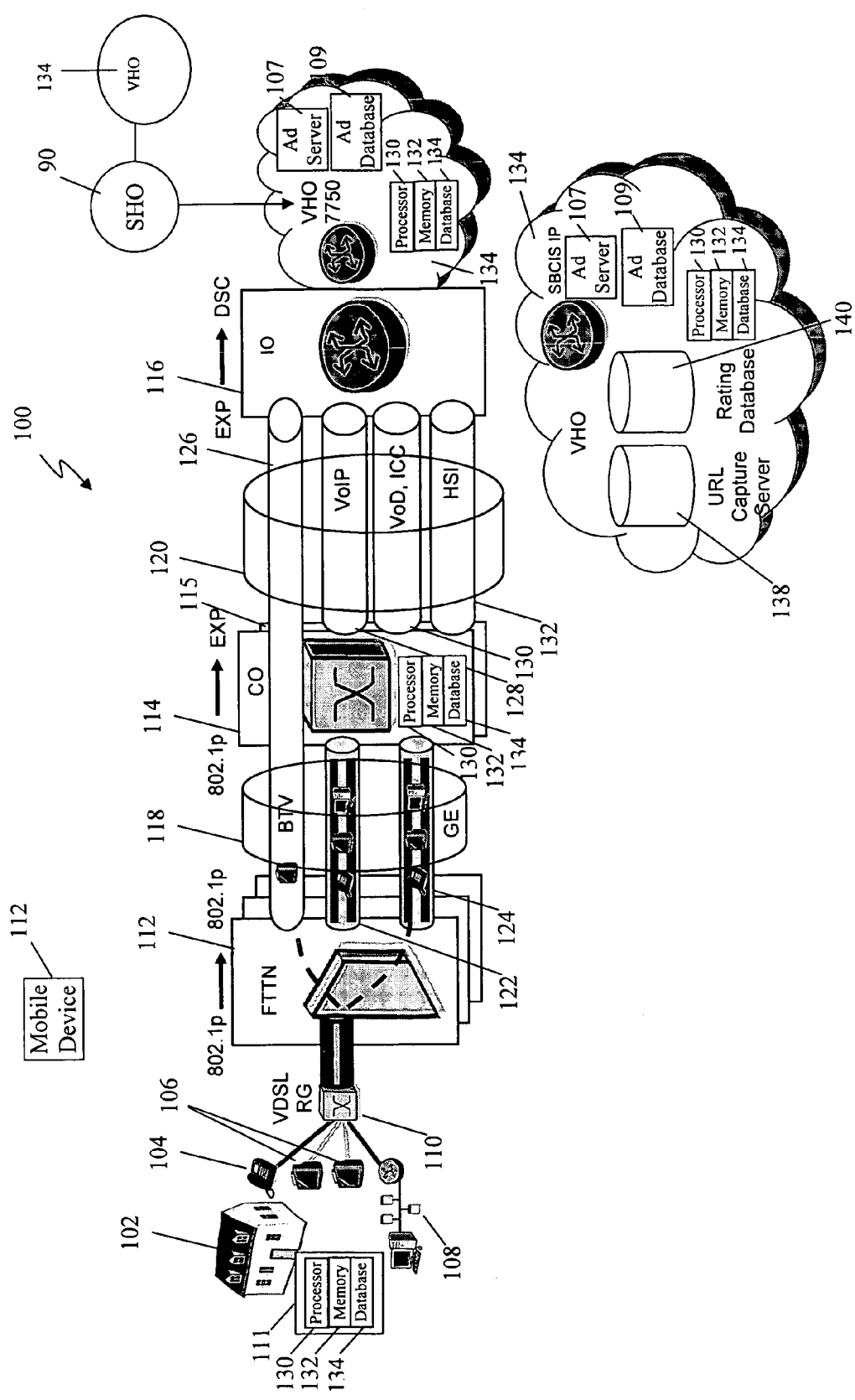
FIG. 1 depicts an illustrative embodiment of an IPTV system for targeted advertising.

In an illustrative embodiment a method is disclosed for multicasting targeted advertising data to end user devices, the method including correlating at a regional internet protocol television (IPTV) server, multicast queue data with web data from web sites visited by each of a plurality of end user devices associated with the regional IPTV server; selecting a subgroup of end user devices from the plurality of end user devices to receive targeted advertising data correlating with a member of the multicast queue data; and multicasting targeted advertising data associated with the member of the multicast queue data to the subgroup of end user devices from the regional IPTV server.

In another illustrative embodiment, the web data and multicast queue data further comprise data selected from the group consisting of image, text, audio and video data, wherein the correlating further comprises comparing the web data to each member of the multicast queue data, the selecting further including placing end user devices in a subgroup associated with a member of the multicast queue based on the correlating.

In another illustrative embodiment the member is data indicating advertising data in an advertising category selected from the group consisting of image, text, video and audio data.

In another illustrative embodiment the correlating further comprises comparing advertising categories for the web data and the multicast queue data to a advertising categories for an end user profile for each of the end user devices, wherein the end user profile comprises data selected from the group consisting of image, text, audio and video data.

In another illustrative embodiment the method further includes receiving the multicast queue data at the regional advertising server from a super regional IPTV server, wherein the multicast queue data further includes image, video, audio and text data indicating regional advertising data associated with the web data for the regional IPTV server. In another illustrative embodiment the method further includes receiving at the regional IPTV server end user selection data indicating a selection of targeted advertising data multicast to the end user device; accessing contact data associated with the end user selection data; and sending a message associated with the targeted advertising data to an end user address in the contact data.

In another illustrative embodiment the end user address further comprises data indicative of an end user address selected from the group consisting of an internet protocol address and a physical address, and wherein the message further comprises data selected from the group consisting of an email, phone call, text message and an advertisement mailed to the physical address. In another illustrative embodiment the multicast queue data further comprises regional and demographic data sent to the regional IPTV server associated with the plurality of end users.

In another illustrative embodiment a system is disclosed for multicasting targeted advertising data to end user devices. In another illustrative embodiment the system further includes a regional IPTV server containing a processor in data communication with a computer readable medium; and a computer program comprising instructions embedded in the computer readable medium, the computer program further comprising instructions to correlate at the regional internet protocol television (IPTV) server, multicast queue data with web data from web sites, instructions to select a subgroup of end user devices from the plurality of end user devices to receive targeted advertising data correlating with a member of the multicast queue data and instructions to multicast targeted advertising data associated with the member of the multicast queue data to the subgroup of end user devices from the regional IPTV server.

In another illustrative embodiment of the system, in the computer program, the web data visited by each of a plurality of end user devices associated with the regional IPTV server and multicast queue data further comprise data selected from the group consisting of image, text, audio and video data, wherein the instructions to correlate further comprise instructions to compare the web data to each member of the multicast queue data, wherein the instructions to select further comprise instructions to place end user devices in a subgroup associated with a member of the multicast queue based on the correlating.

In another illustrative embodiment the member includes data indicating advertising data in an advertising category selected from the group consisting of image, text, video and audio data.

In another illustrative embodiment of the system, in the computer program, the instructions to correlate further comprise instructions to compare the web data and the multicast queue data to a user profile for each of the end user devices. In another illustrative embodiment of the system the user profile comprises data selected from the group consisting of image, text, audio and video data.

In another illustrative embodiment of the system the computer program further comprises instructions to receive the multicast queue data at the regional advertising server from a super regional IPTV server, wherein the multicast queue data comprises image, video, audio and text data indicating regional advertising data associated with the regional IPTV server.

In another illustrative embodiment of the system computer program further comprises instructions to receive at the regional IPTV server end user selection data indicating a selection of targeted advertising data multicast to the end user device, instructions to access contact data associated with the end user selection data and instructions to send a message associated with the targeted advertising data to an end user address in the contact data.

In another illustrative embodiment of the system, the end user address further comprises data indicative of an end user address selected from the group consisting of an internet protocol address and a physical address, and the message further comprises data selected from the group consisting of an email, phone call, text message and an advertisement mailed to the physical address. In another illustrative embodiment of the system, the multicast queue data further comprises regional location data and demographic data associated with the plurality of end users.

In another illustrative embodiment a computer readable medium is disclosed containing an embedded computer program of instructions executable by a processor at a regional IPTV server, the computer program useful for multicasting targeted advertising data to end user devices from the regional IPTV server, the computer program comprising instructions to correlate at the regional internet protocol television (IPTV) server, multicast queue data with web data from web sites visited by each of a plurality of end user devices associated with the regional IPTV server, instructions to select a subgroup of end user devices from the plurality of end user devices to receive targeted advertising data correlating with a member of the multicast queue data and instructions to multicast targeted advertising data associated with the member of the multicast queue data to the subgroup of end user devices from the regional IPTV server.

In another illustrative embodiment of the medium, the computer program, the web data and multicast queue data further comprise data selected from the group consisting of image, text, audio and video data, wherein the instructions to correlate further comprise instructions to compare the web data to each member of the multicast queue data, the instructions to select further comprising instructions to place end user devices in a subgroup associated with a member of the multicast queue data based on the correlating.

In another illustrative embodiment of a method is disclosed for receiving multicast targeted advertising data at an end user device, the method comprising receiving from an IPTV regional server multicast targeted advertising data correlating with a member of a multicast queue data and web data from web sites visited by the end user device, wherein the end user device is a member of a subgroup of end user devices correlating with the member of multicast queue data.

In another illustrative embodiment a system is disclosed for receiving multicast targeted advertising data at an end user device, the system comprising a processor in data communication with a computer readable medium; and a computer program embedded in the computer readable medium containing instructions executable by the processor, the computer program comprising instructions to receive from an IPTV regional server multicast targeted advertising data correlating with a member of multicast queue data and correlating with web data from web sites visited by the end user device, wherein the end user device is a member of a subgroup of end user devices correlating with the member of multicast queue data and the web data.

In another illustrative embodiment, a data structure embedded in a computer readable medium is disclosed, the data structure comprising a first field for containing data indicating web data selected from the group consisting of video, audio, text and image data associated with a web site visited by an end user device in an internet protocol television (IPTV) system and a second field containing data indicating multicast queue data selected from the group consisting of video, image, text and audio data for correlating with the web data to select targeted advertising data for multicast to a selected subgroup of a plurality of end user devices associated with a regional IPTV server.

In another illustrative embodiment of the data structure further comprises a third field for containing data indicating a contact address for the end user device for sending a message to the end user device at the address, the address further comprising data selected from the group consisting of an internet protocol address and a physical address.

In an illustrative embodiment a method and system are disclosed for multicasting multiple advertisements to selected end user device sub groups during a single timeslot and delivering specific advertising data to customer viewing the end user devices based on browsing habits and demographic data for the end users. In an illustrative embodiment a system for recording websites visited by a particular end user device for the purpose of forwarding specific advertisements to that subscriber based on corollary data. Specifically, in an illustrative embodiment the system calls for enhancements on a domain name server (DNS) (or a similar type of system that has access to subscriber data) which will keep track of uniform resource indicators (URIs) that a subscriber visits, forward the URIs to a system which keeps track of URIs that the subscriber has visited. The system contains a set of corollary or related data set of related advertisements that are associated with the set of URIs that the person has visited.

Traditional television (TV) advertisement is broadcast based, in which every broadcast audience member receives the same TV advertisement at the same time. This traditional kind of TV advertisement model was built upon the broadcast based cable, satellite or over-air TV networks. Broadcast based TV advertisement may not be cost effective for all advertisers from business perspective. The purpose of advertisement is to pass information to potential customers. Broadcast based advertisement fits large business well; such as national retailer chains, drink companies, wireless phone companies, etc. because almost every audience member is their potential customer. However, for most of the small and medium size businesses, only a small part of the audiences are potential customers.

For example, a diaper advertisement is not applicable to all audience members because a family will probably not buy diapers if there are no babies in the family. A targeted advertising solution is to only send a particular advertisement (diaper advertisement) to a particular targeted audience group (families with babies) rather than an indiscriminate broadcast to every member of an audience. In other words, audience members will only be sent the advertisement in which he/she is interested or related. In an illustrative embodiment a TV service provider can send multiple advertisements at the same time period and charge less for each advertisement than for a broadcast advertisement, but maintaining the effectiveness within the target group of viewers. For example, during a prime 30 minute time advertising slot, 8 advertisements can be sent out to all the audiences with traditional broadcast based TV network advertising; but in an illustrative embodiment, 80 or more advertisements can be sent out to 10 different audience groups over a multicast IPTV network. If IPTV service provider charges 50% of the advertisement price of traditional broadcast advertising TV, IPTV service provide will still have advertising revenue several times higher than that of traditional broadcast TV advertising. In an illustrative embodiment a multicast based IPTV system supports personalized advertisement with very high network bandwidth utilization. An illustrative embodiment implements the targeted advertisement system and method integrate this targeted advertising feature with voice, video and data services in an IPTV network offering IPTV, VoIP and data services.

In an illustrative embodiment a particular advertisement is sent to a particular selected audience sub group of end user devices. In other words, any audience member need only watch the advertisements in which he/she is interested or to which he/she are correlatively related.

For example, if a person has visited www.weather.com and www.accuweather.com, the database may associate the browsing habit with an individual whom has an interest in weather, so the system and method would send an advertisement back to the set top box of the subscriber displaying an advertisement for weather. The illustrative embodiment can also insert advertising data in local advertising spots in a video data stream during commercials in a manner such that the person who likes weather web sites can be sent an advertisement for weather history books when the local commercial insertion spot is available on the nightly news. Additionally, this system compensates for nomadic usage or usage based on DHCP assignments of the CPE, so if the subscribers IP address changes, the illustrative embodiment advertising system and method still function appropriately. Thus in an illustrative embodiment, a method and system are provided for dynamically tracking, selecting and forwarding IP accounting records for mobile end user devices 112.

An illustrative embodiment solves the problem of advertisers wasting dollars in specific markets where there is no demonstrated interest in their advertising offering. The illustrative embodiment solves that problem by gathering subscriber data from the IPTV network. The illustrative embodiment takes data from what the user enters into their browser and correlates their browsing habits to an interest. Therefore an IPTV service provider can sell targeted advertising data to a captive market. Furthermore, the system allows multiple advertisements to run in a single commercial timeslot, selecting which commercials are multicast to which specific customer's end user device, for example, a mobile cell phone, or household set top box.

IPTV, Voice over IP and internet providers display advertising data based on specifically on what an end user searches on the World Wide Web, for example a service provider company may display an advertisement for an apple farm if an end user searches for the string "how long is the apple growing season". The illustrative embodiment system and method captures information on the users browsing habits at the DNS server or probe that is local to the user. Note that information can also be captured using other means such as in line taps and probe device so one need not be limited to the use of a DNS server to accomplish the URI capturing. Therefore, we will refer to the URI capturing mechanism as the URI capture server. Furthermore the illustrative system and method dynamically tracks the URIs an end user has visited even if the IP address of the user changes. The illustrative embodiment stores the URI strings that an end user has visited for the purpose of correlating the users browsing habits to an advertisement that is appropriate for that end user. Specifically, the system looks for adjectives, Nouns and Verbs in the URI. Adjectives are weighted lower than nouns and verbs. Pronouns are ignored. Adverbs are ignored. Once the system has parsed and rated the URIs it then searches for relative advertisements to display to the user. The system and method can display advertisements to the user on their set top box, telephone, or cell phone. Advertisers can be better assured that they are reaching a target market of end users that are interested in what they have to sell.

In an illustrative embodiment a system is disclosed which correlates browsing habits to user specific advertisements. The system keeps track of a users browsing habits as well as it correlates information relating to any demographic information on the user such as age, sex martial status, location, and income. An illustrative embodiment combines real time end user browsing information as well as demographic user data to specifically tailor advertisements to that end user at the end user device such as a set top box, telephone or cell phone of the user. Any website URI that the user enters into a browser is recorded by the URI server of the user and sent to the advertisement server for correlation to other known demographic data of that end user for the purpose of multicasting targeted advertisements to that end user interface. An illustrative embodiment can be used in targeted television advertisement as commercials can be sent on a specific basis to selected customers at end user devices. For example, when the local advertising data insertion spot is inserted on the nightly news an IPTV service provider can sell and send not just one advertising spot for the time, but several. For instance an IPTV service provider can multicast any number of commercials at he same time. For this purpose we will say 10 commercials at the same time. Subscribers will join the commercial multicast that is most appropriate to their interests identified by their browsing habits and demographics.

Also contained in the system is a rating system that provides for each commercial to be rated with a specific advertising data tag. The advertising data tag is a description of the commercial. An example of this is a commercial for computers would be tagged as technology.

The tag may also include but is not limited to image, video, text and audio data associated with the advertisement which can be used for correlating advertising categories for the tagged advertising data with advertising categories for multicast queue data and end user profile data. The multicast queue data, web data interrogated from web sites visited by end users, and user profiles for end user devices associated with a regional IPTV server contain image, video, text and audio data for correlation and selection of sub groups of end users to receive multicast targeted advertising data in advertising categories in which the sub groups of end users are interested. The multicast queue data, web data interrogated from web sites visited by end users, and user profiles for end user devices associated with a regional IPTV server contain regional image, video, text and audio data for correlation and selection of sub groups of end users to receive regional multicast targeted advertising data. Commercially available image, video, text and audio data recognition and correlation systems are used to correlate and compare image, video, text and audio data in the multicast queue data, web data interrogated from web sites visited by end users, and user profiles to select subgroups to receive multicast targeted advertising data in correlated advertising categories.

The tag can also contain image, text, audio or video data associated with the advertising data. The word technology might be associated with computer, wireless LAN, television, and stereo. Each end user on the IPTV system can have a rating in advertising categories which is derived from the nouns and verbs and advertising data of the URIs they have browsed, data is then combined with the demographic data for the customer. When it is time for the local advertising insertion during a program, the illustrative system and method will send out multiple streams of advertising data which are addressable to the specific rating of the customer. Sports fans having an interest in an advertising category "sports" will receive advertising data in the "sport" category, i.e., sports commercials, as technology fans will receive technology commercials.

Cell phone users can be directed to promotional content which runs an advertisement before the subscriber can view the promotional content. This advertising data can be specific to the user as well, since we will know about the users viewing habits from their web browsing. The corollary and collection system is in itself novel because it keeps track of subscriber browsing habits and then the system looks for Nouns, and Verbs in the URIs and advertising data it has received from the URI capture server and the web site associated with the URI. Adjectives are included as well however, they are weighted a little lower then nouns and verbs. Adverbs are ignored. For example, Nouns=7, verbs=6, adjectives=4 and adverbs=0 on a scale of 10 for weighting purposes. One other unique and novel aspect is this system can retire or augment the rating for a customer after a certain specified time. For example a customer who is rated to receive sports commercials since they had been surfing sports sites can begin to receive other types of commercials when they receive a new rating from surfing real estate sites.

A particular illustrative embodiment enables IPTV, VoIP and/or Internet data service providers (SPs) to collect, correlate and store data according to the usage habits of a subscriber. The data is also correlated to match an appropriate advertisement, which can be based on demographic factors such as age, sex, and income. For example, a household that surfs a lot of sites containing the noun "beach" in the name can be displayed specific advertisements for beaches in their area that may be advertising, or for higher income subscribers as identified by the database-beach destination resorts such as Aruba or Bermuda. An IPTV service provider can now sell advertisement spots for a higher value per timeslot or multiple advertisements per timeslot since the system will have the capability of streaming multiple advertisements simultaneously.

A subscriber will only receive the advertising data that is specific to them as a member of a particular multicast sub group of end users. The IPTV/VoIP/Internet Service Provider (SP) is in position as the access provider to collect data regarding end user usage habits and interests in particular advertising categories for the subscribers and then associate those habits with specific targeted advertisements in particular advertising categories. The IPTV/VoIP/Internet SP is able to charge a premium for those advertisements since they are going to a direct market of individuals who have a demonstrated interest (via collection of their usage habits) in that material that the would-be advertiser is marketing. Usage habits also include monitoring telephone numbers called, text messaging, emails and electronic purchases over the internet. The monitored data is anonymous as to the identity of the end user and not used by the service provider for targeted advertising unless an end user opts-in and selects to participate.

Turning now to FIG. 1 in an illustrative embodiment an internet protocol television (IPTV)/VoIP/Internet service provider ("IPTV") network 100 is utilized to deliver video, audio, text and image data streams to an end user household 102 from an IPTV system 100. As shown in FIG. 1 household 102 utilizes devices that interact with the IPTV system which includes voice over internet protocol (VoIP) and internet data services. These devices include a VoIP telephone 104, IPTV displays 106 and internet data devices such as personal computers 108. In an illustrative embodiment, each of these devices connects to the IPTV/VoIP/Internet data services system (hereinafter collective referred to as the "IPTV system") through a very high bit rate digital service line residential gateway (VDSL RG) 110.

In an illustrative embodiment, the IPTV network hierarchically distributes video, audio, text and image data streams from a video head end to central offices to gateways such as regional gateway 110 to end user devices such as STB 111 or mobile devices 112. Other gateways and digital data delivery may be used other than the IPTV system shown in the illustrative embodiment. Each super head end (SHO/super regional server), video head end (VHO/regional server), central office (CO/local server), gateway or residential gateway (RG) and end user device (for example a set top box with remote control) includes computer readable medium (memory) 130, processor 132, and a database 134. An illustrative embodiment is applicable to any server in an hierarchical network or set of interconnected server, whether such servers are designated as super regional, regional, local or another designation. The residential gateway (RG) is connected at the residence 102 through fiber to the node (FTTN) connections 112. These FTTN connections split the device signals over three separate lines. These three separate lines comprise business television (BTV) 126, cell phones, VoIP, IPTV services and internet data services 122, and VoIP, IPTV services and internet data services 124. Data over gigabyte Ethernet connection 118 carrying VoIP, IPTV and internet services over lines 122 and 124 connect to a router 125 at a central office (CO) 114 server in the IPTV network. The router 125 connects to a 10 gigabyte Ethernet connection 120.

A super head end IPTV server (SHO) 90 formulates regional multicast queue data and downloads a separate and unique regional multicast queue data to each regional VHO in the IPTV network. The 10 gigabyte Ethernet connection 120 carries VoIP 128, video on demand (VoD) and ICC 130, and HSI data 132 to router 116. Router 116 connects to a regional server, video head end (VHO) 134 which is part of the IPTV system. There may be sub-regional servers such as the central office server (CO) between the regional server (VHO) and the end user device (STB). The VDSL RG 110 receives advertising data, i.e., commercials that are rated for the particular household 102 of end users. Web sites that the customer at household 102 browses are captured in a database 138 interrogated and reviewed and then sent to a rating database 140. An illustrative embodiment interrogates the web sites represent by URIs that the end user has visited. The interrogation visits the web sites and looks at, retrieves, stores and evaluates image, video, text and audio data for the web site. The web sites are characterized as to advertising categories.

The rating database 140 looks at the web data determines what commercials are best suited for the customer based on the customer's rating in advertising categories in an end user profile. In an illustrative embodiment, the system and method correlate the web data, user profiles data and multicast advertising queue data members to assign subgroups of end user devices. The multicast advertising queue data members are used to locate regional advertising data from an advertising server at the regional IPTV server, i.e., VHO.

The databases 138 and 140 are accessible over the internet by or located at the VHO 134 or an end user device such as a set top box (STB) 111 at household 102. When a user at end user device household 102 visits a web site the universal resource indicator (URI) is captured and stored in the URI capture server 138. The rating database determines this customer should receive a particular advertising data in a particular advertising category based on the rating database by analyzing the end user ("viewer") profile of the end user and the content of the URI. The content of the URI string is parsed by a natural language processor to select nouns and verbs appearing in the URI title. The nouns and verbs appearing in the URI title are weighted based on the user profile and based on the part of speech upon they are based and used to generate keywords for selection of an advertisement for presentation to the user at household 102 based on their profile rating and a matching to an advertising data.

For example, if an end user goes to www.soccer.com, www.worldcup.com, and www.aruba.com the rating database 140 may determine this end user should receive sports company advertisements as well vacation commercials for the next hour or so. The RG 110 receives multicast advertising data or commercials that are rated for that particular household based on the user profile and content of the web sites that the user has visited. The rating database and the URI capture server are utilized to investigate the URI web sites and look for image data, video data, text data and audio data related to a particular set of keywords associated with the URI that has previously been parsed to develop keywords. The VHO 134 streams multicast data streams of multiple commercials on each time slot directed at those users whom are a good fit for the classification of the advertisement based on their viewer profile and viewing history.

As shown in FIG. 1, 802.1 p is an IEEE standard for providing quality of service (QoS) in 802-based networks. 802.1p uses three bits to allow switching to reorder packets based on priority level. It also defines the Generic Attributes Registration Protocol (GARP) and the GARP VIAN Registration Protocol (GVRP). GARP lets client stations request membership in a multicast domain, and GVRP lets them register into a VLAN. 802.1p is an IEEE extension of 801.10. It is the specification for the use of MAC-layer bridges in filtering and expediting multicast traffic. Prioritization of traffic is accomplished through the addition of a 3-bit, priority value in the frame header. Eight topology-independent priority values (0-7) are specified, with all eight values mapping directly into 802.4 and 802.6. Switches that support 8021P and 802.1Q provide a framework for bandwidth prioritization. Essentially what all these words mean is that you can assign a priority to the type of traffic with IEEE 802.1 p class-of-service (CoS) values and these allow network devices along the way to recognize and deliver high-priority traffic in a predictable manner. When congestion occurs, QoS drops low-priority traffic to allow delivery of high-priority traffic.

As shown in FIG. 1, differentiated services is a set of technologies proposed by the IETF (Internet Engineering Task Force) which would allow Internet and other IP-based network service providers to offer differentiated levels of service to individual customers and their information streams. On the basis of a DiffServe CodePoint (DSCP) marker in the header of each IP (Internet Protocol) packet, the network routers would apply different Per-Hop Behaviors (PHBs). In other words, for an additional charge, DiffServe would allow service providers to provide a certain user with a preferential Grade of Service (GoS) for all packet traffic with appropriate indicators in the packet headers. The preferential GoS, which is only attempted and not guaranteed, would include a lower level of packet latency (delay), as those packets would advance to the head of a packet queue in a buffer should the network suffer congestion. RSVP (Resource ReserVation Protocol), a developing protocol, is an element of DiffServe.

Figure 2:
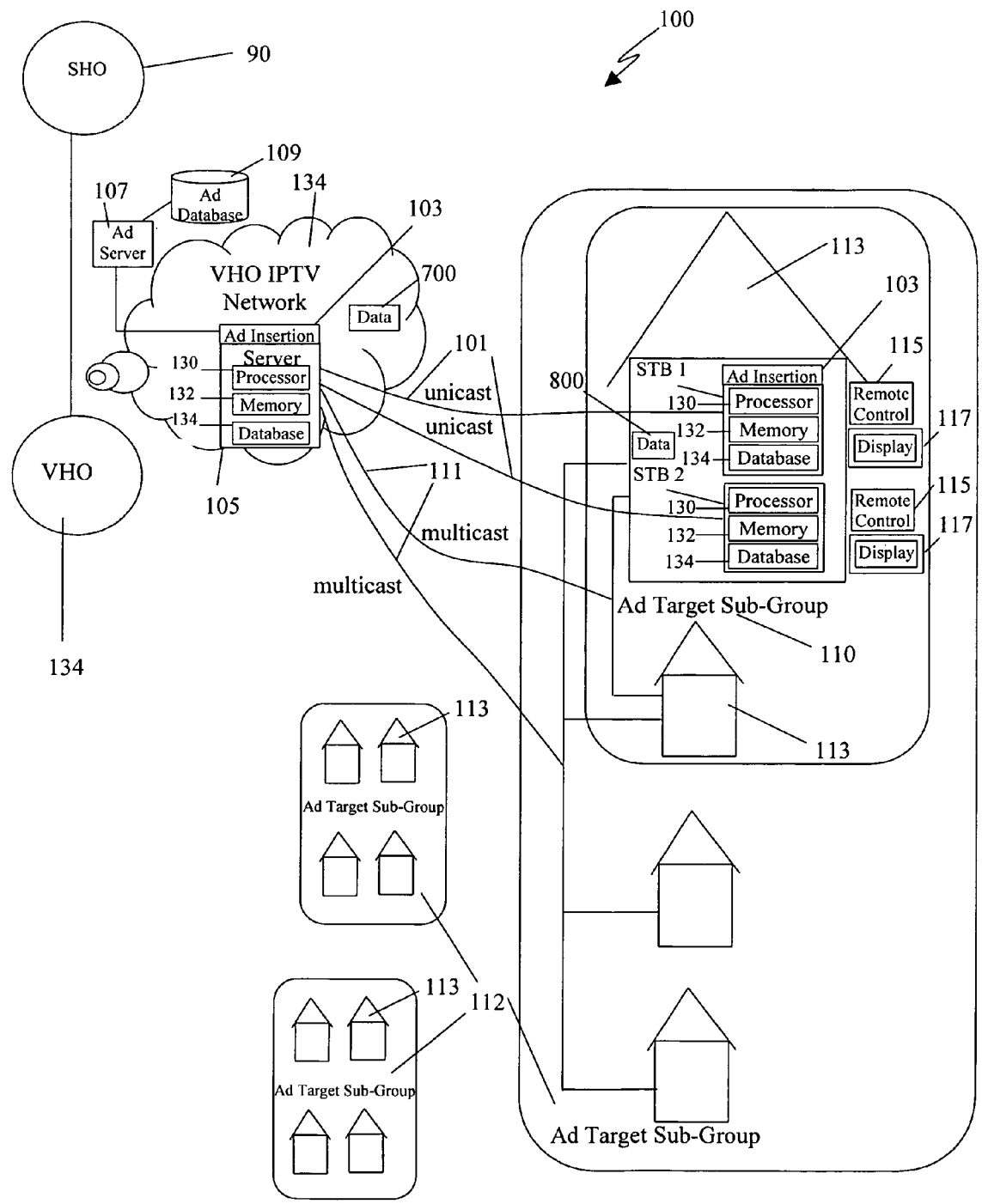
FIG. 2 depicts an illustrative embodiment of an internet protocol television (IPTV) system for multicasting targeted advertising data to subgroups of end user client devices.

Turning now to FIG. 2 as shown in FIG. 2 the IPTV network 100 SHO 90 delivers content and regional multicast queue data to the regional video head end (VHO, regional IPTV server) 134 containing server 105 to effectuate delivery of regional advertising data to end user devices associated with the regional servers (VHO, CO, etc.) The regional server 105 at the VHO delivers content and targeted advertising data via unicast or multicast depending on the size of the targeted sub group of end user devices (STB 131) to which the targeted advertising data is directed. As shown in FIG. 2 sub groups 112 receive multicast 111 advertising from regional VHO 134 server 105. End user device sub-groups 110 receive multicast 108 targeted advertising data from VHO regional server 105. Individual households receive unicast 106 advertising to set top box 131 when an end user sub group contains only one end user device. More then one set top box can be located in an individual household 102 and each individual set top box can receive a separate unicast or multicast advertising stream 106. Having a separate advertising displayed at each set top box (STB) 131 tailored to target the subscriber watching television at that particular STB. Each server 104 and STB 131 contains a processor 130, a memory 132 and a database 134. Each STB 131 has an associated remote control 115 and display 117.

FIG. 2 depicts an illustrative advertising insertion system wherein advertising data can be inserted into a video multicast or unicast at the IPTV regional VHO server or at the end user client device, for example, an STB. Advertising data can be inserted into an IPTV video stream via advertising insertion device 103 at the IPTV server 105 or the STB 131. The IPTV server includes an advertising server 107 and an advertising database 109. The advertising data is selected from the advertising database and delivered by the advertising server 107 to the IPTV server 105. The advertising server processor keeps track of available bandwidth between the advertising server and a target group of selected opt-in IPTV subscribers. This bandwidth data can be stored in the memory 132, database 134 or a data structure in the computer readable memory as described below in FIG. 8.

Figure 3:
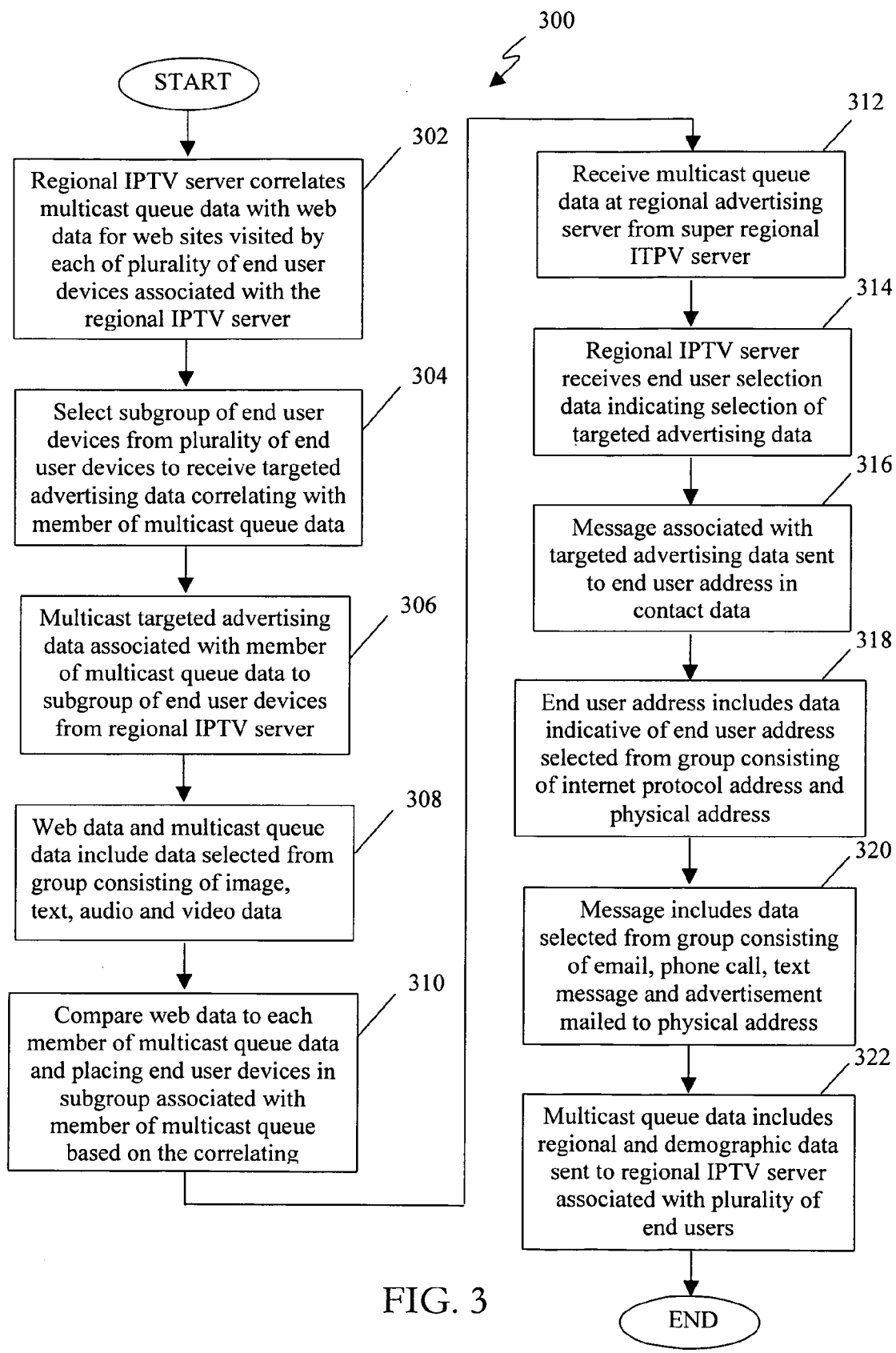
FIG. 3 depicts an illustrative embodiment of a flow chart of functions performed in another illustrative embodiment.

Turning now to FIG. 3, in an illustrative embodiment, a method is disclosed for multicasting targeted advertising data to end user devices, the method including correlating at a regional internet protocol television (IPTV) server, multicast queue data with web data from web sites visited by each of a plurality of end user devices associated with the regional IPTV server at block 302. The method further includes selecting a subgroup of end user devices from the plurality of end user devices to receive targeted advertising data correlating with a member of the multicast queue data as shown at block 304. The method further includes multicasting targeted advertising data associated with the member of the multicast queue data to the subgroup of end user devices from the regional IPTV server as shown at block 306.

In another illustrative embodiment, the web data and multicast queue data further comprise data selected from the group consisting of image, text, audio and video data as shown at block 308. In another particular embodiment, the correlating further comprises comparing the web data to each member of the multicast queue data, the selecting further including placing end user devices in a subgroup associated with a member of the multicast queue based on the correlating as shown at block 310.

In another illustrative embodiment the correlating further comprises comparing the web data and the multicast queue data to a user profile for each of the end user devices, wherein the user profile comprises data selected from the group consisting of image, text, audio and video data wherein each member of the multicast queue is in an advertising category including but not limited to sports, fashion, news, etc. The multicast queue member advertising categories are correlated with the user profile advertising categories. The user profile includes user interest in the advertising categories, so that users having an interest in an advertising category may be selected to receive advertising data in that advertising category. In another illustrative embodiment the method further includes receiving the multicast queue data at the regional advertising server from a super regional IPTV server as shown at block 312. In another illustrative embodiment, the multicast queue data comprises image, video, audio and text data indicating regional advertising data associated with the regional IPTV server. In another illustrative embodiment the method further includes receiving at the regional IPTV server end user selection data indicating a selection of targeted advertising data multicast to the end user device as shown at block 314. In another particular embodiment, the method further includes accessing contact data associated with the end user selection data and sending a message associated with the targeted advertising data to an end user address in the contact data as shown in block 318.

In another illustrative embodiment the end user address further comprises data indicative of an end user address selected from the group consisting of an internet protocol address and a physical address, and wherein the message further comprises data selected from the group consisting of an email, phone call, text message and an advertisement mailed to the physical address as shown in block 320. In another illustrative embodiment the multicast queue data further comprises regional and demographic data sent to the regional IPTV server associated with the plurality of end users as shown in block 322.

Figure 4:
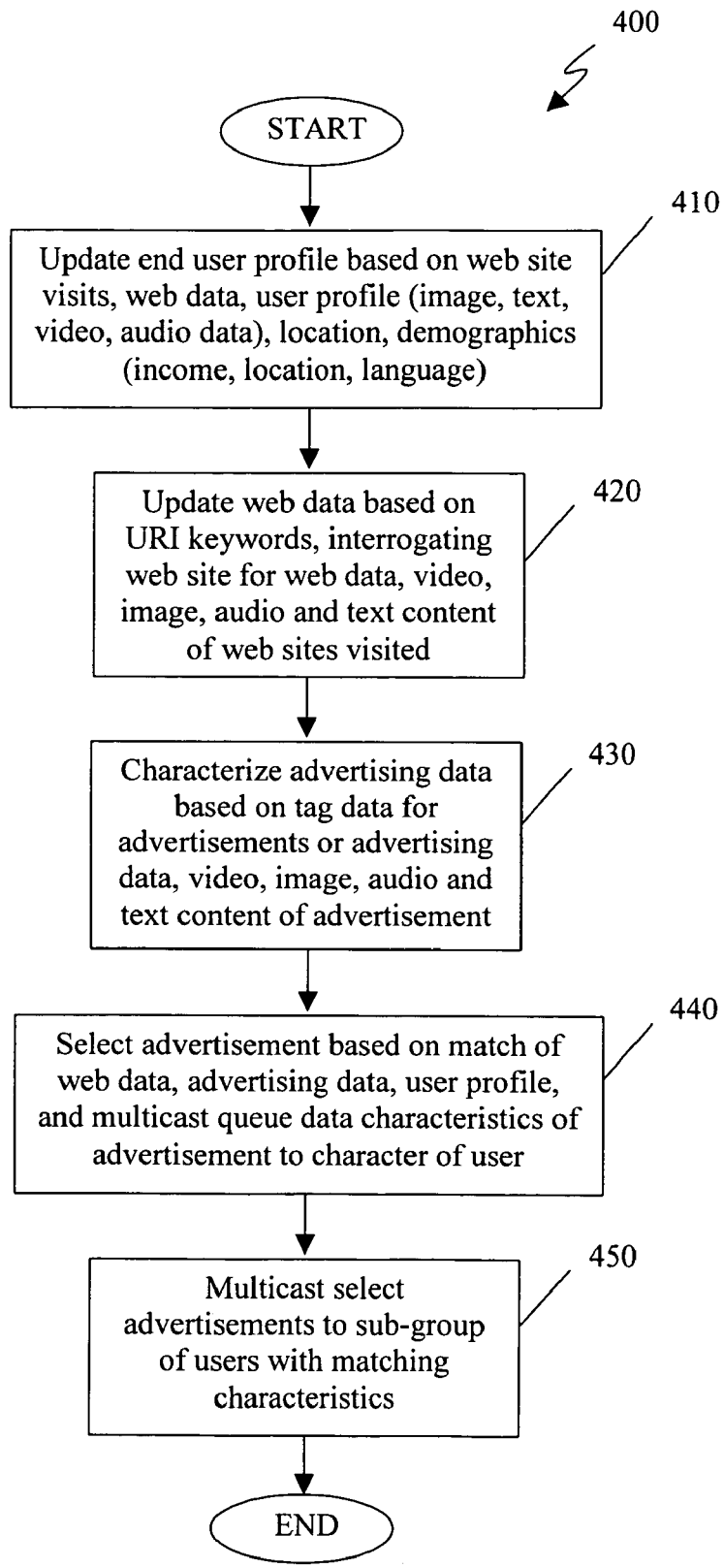
FIG. 4 depicts an illustrative embodiment of a flow chart of functions performed in another illustrative embodiment.

Turning now to FIG. 4, a flow chart for characterizing a user is depicted. Users are characterized into advertising categories based on web site visits viewing history, user profile data, location data, demographics such as income, location, language, etc. at block 410. Web sites are characterized into advertising categories based on URI parsing to get keywords, and advertising data including video, image, audio and text data content of web sites visited by the end user at block 420. Advertisements (advertising data) are characterized into advertising categories based on tag data for advertisements or video, image, audio and text content of advertisement in block 430. Advertisement data is selected based on correlating the characterization (advertising category) of advertisement to the characterization of an end user (advertising category) at block 440. Select advertisements are multicast to end users with matching characterization (advertising category) at block 450.

Figure 5:
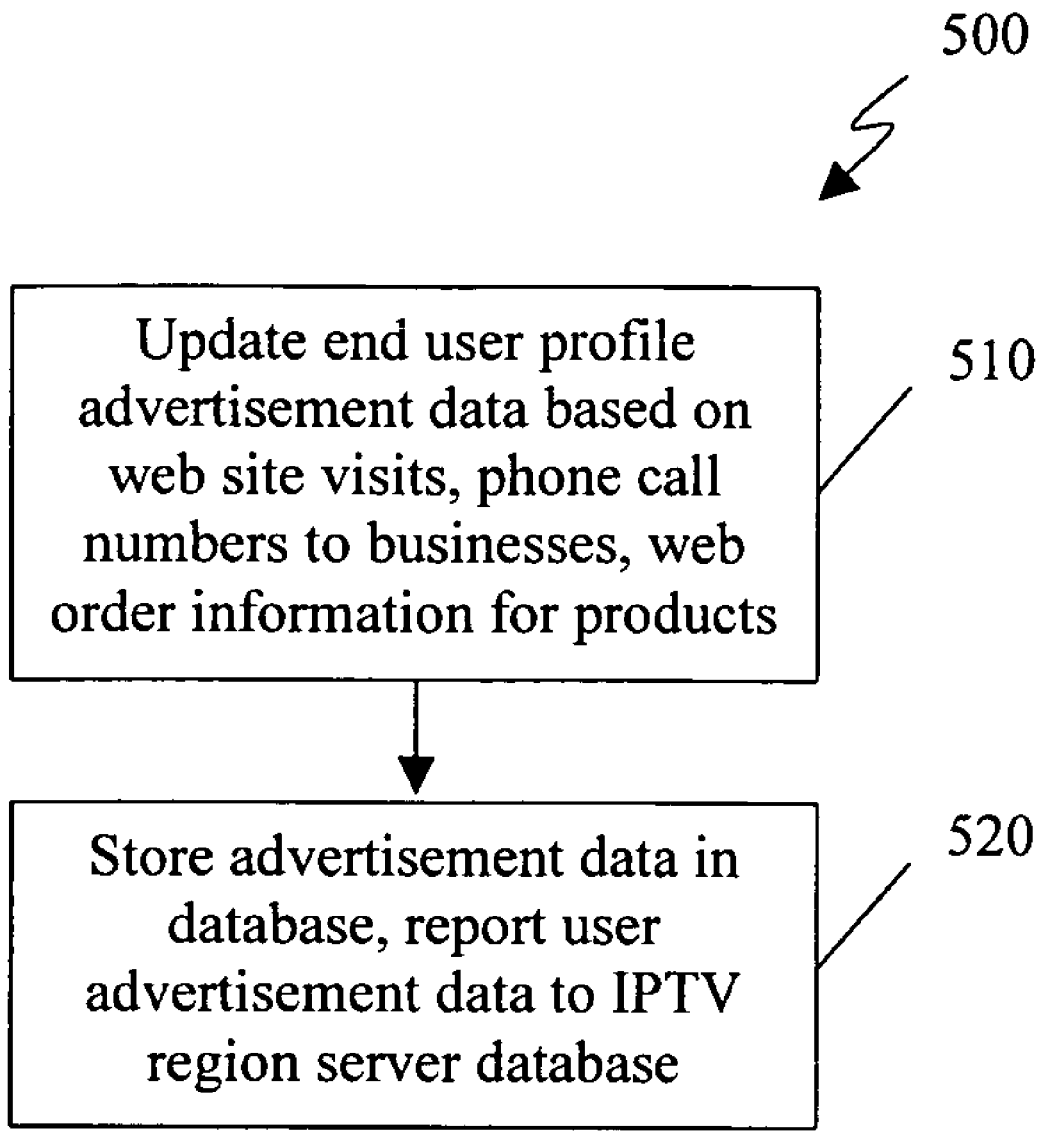
FIG. 5 depicts an illustrative embodiment of a flow chart of functions performed in another illustrative embodiment.

Turning now to FIG. 5, a flow chart for updating end user advertisement data is depicted. End user advertisement data is updated based on web site visits, characterization of phone calls to numbers of businesses, and web order information for products at block 510. Advertisement data is stored in database and end user advertisement data is reported to the IPTV server at block 520.

Figure 6:
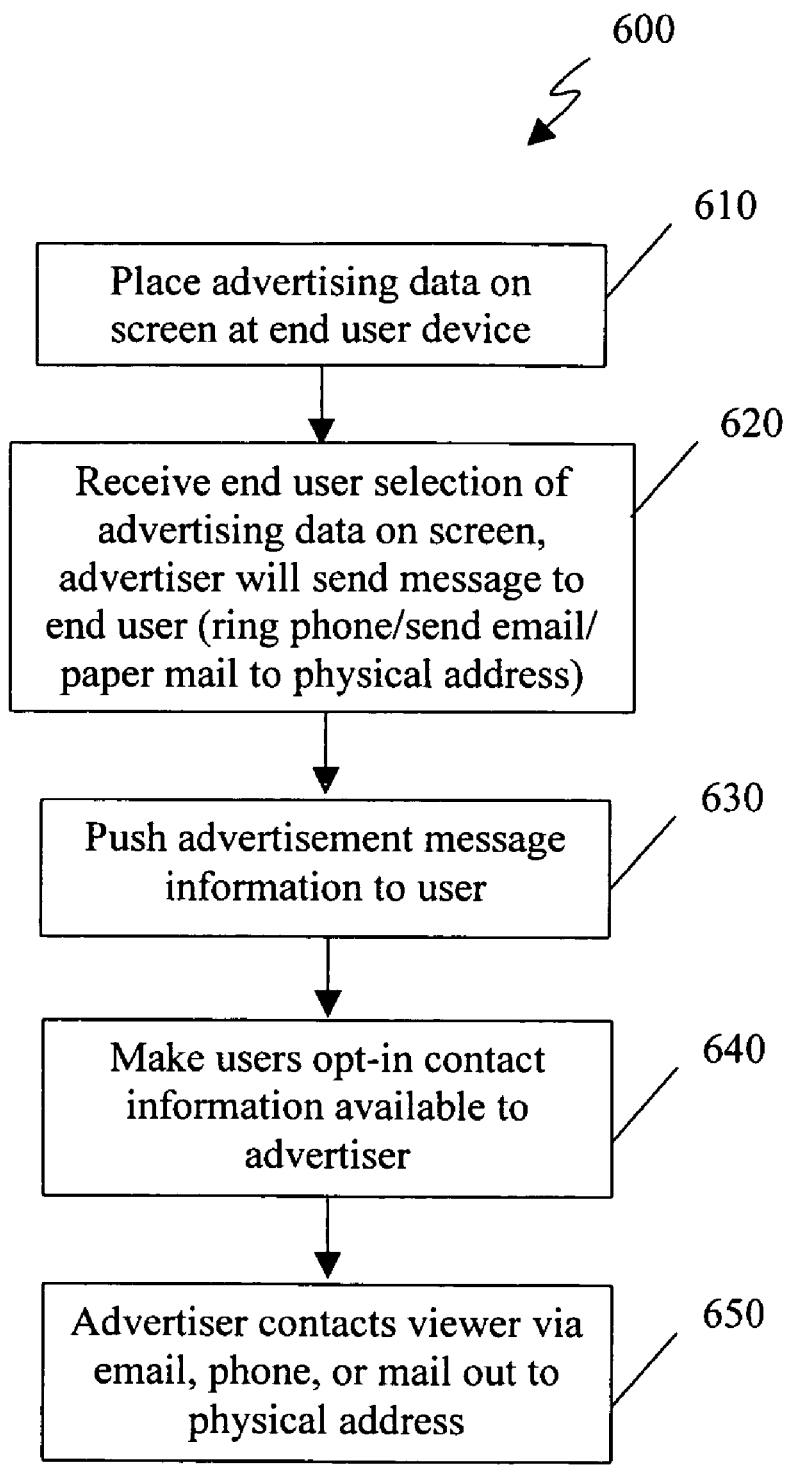
FIG. 6 depicts an illustrative embodiment of a flow chart of functions performed in another illustrative embodiment.

Turning now to FIG. 6, a flow chart for advertisement placement and contact is depicted. Advertising data is placed on the screen at block 610. When an advertisement data is selected by an end user from a presentation screen, an advertiser associated with the selected advertising data is provided with an end user's contact information so that the advertisers can place a telephone call, send an email or physically send an advertising object, such as paper mail brochure or announcement to an end user's physical address at block 620. Advertising data and information are pushed to end users at block 630. Users' opt-in contact information is made available to an advertiser at block 640. An advertiser can then contact an end user via an end user via email, phone call or physical mail out at block 650.

Figure 7:
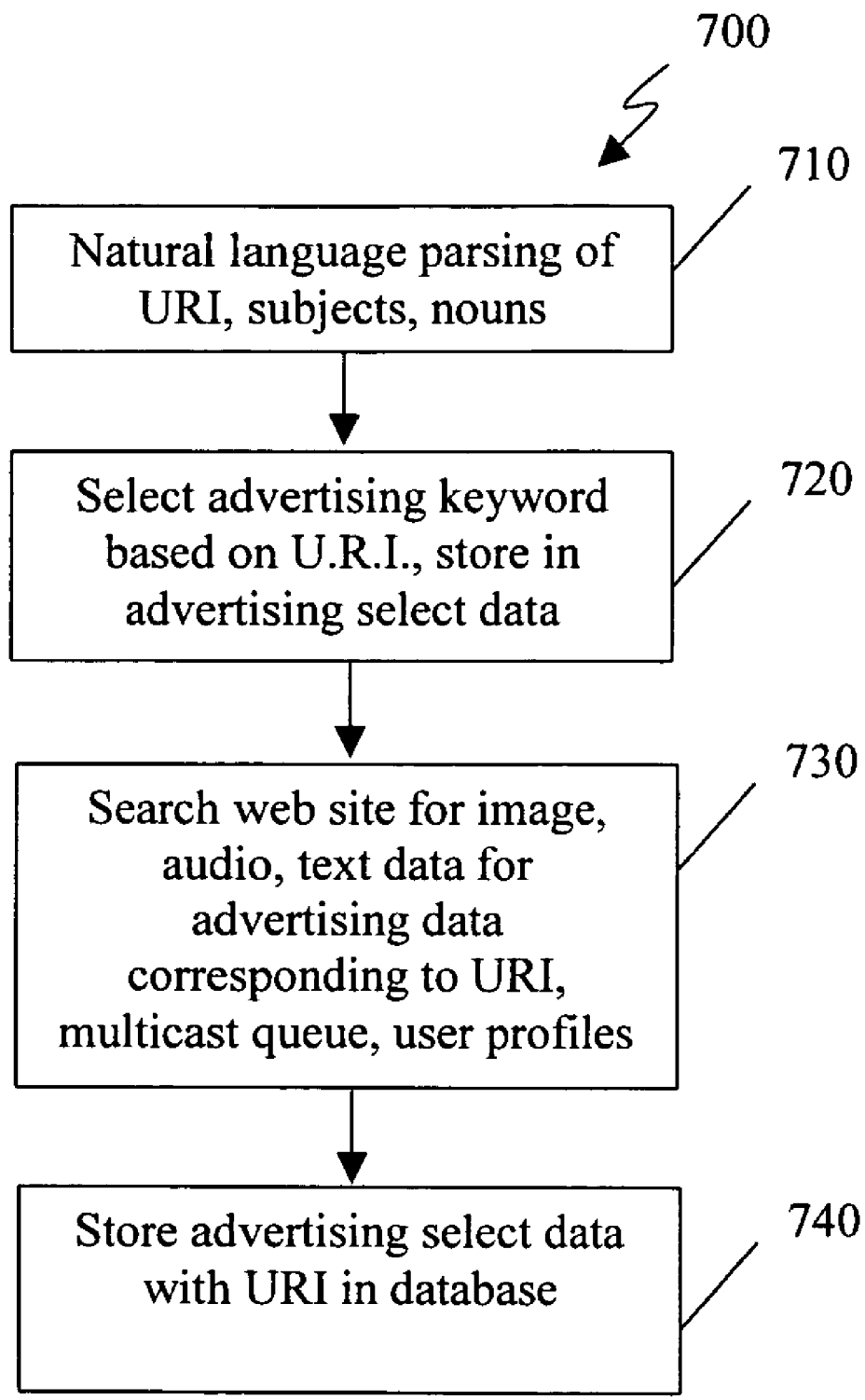
FIG. 7 depicts an illustrative embodiment of a flow chart of functions performed in another illustrative embodiment.

Turning now to FIG. 7, a flow chart for multicast advertising data selection is depicted. Natural language parsing of URIs and web site content is performed at block 710. Advertising keywords are selected based on URI and stored in advertising select data at block 720. Web sites visited by end users are searched and interrogated for image, audio, and text data for correlation with advertising data selection data at block 730. Advertising selection data is stored with URI in database at block 740. The web sites, web data, end users profiles and advertising data are parsed and characterized into advertising categories for correlation and matching advertising data in a particular advertising category with end user's having an interest in the particular advertising category, based on the end user interest in the advertising category.

Figure 8:
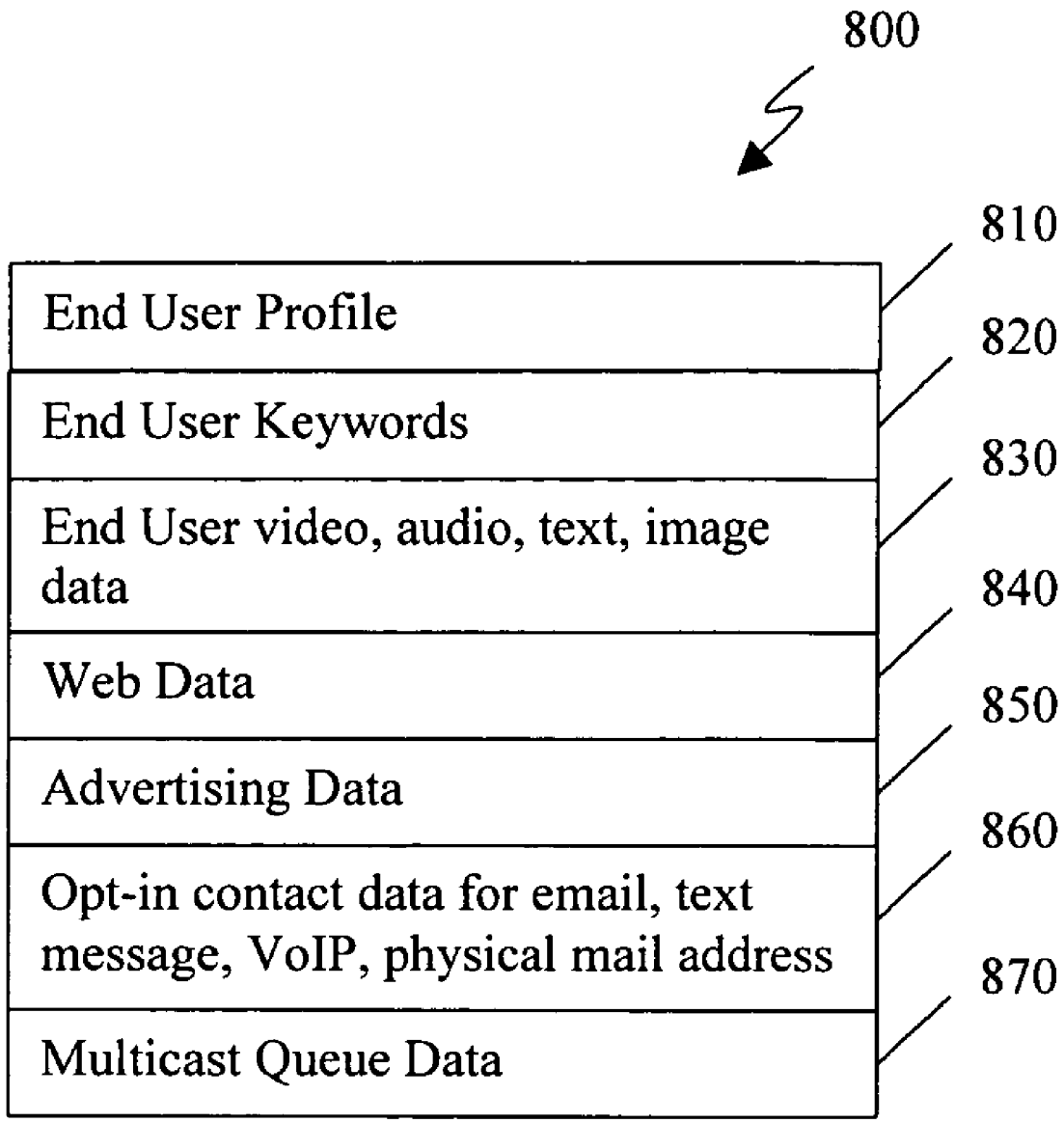
FIG. 8 depicts a data structure for storing data in another illustrative embodiment.

Turning now to FIG. 8, a data structure for use in an illustrative embodiment is depicted as stored in memory in a computer readable medium. The data structure 800 includes an end user profile identifier field 810 for containing image, video, text and audio data indicative of an end user profile and interests in advertising categories. The data structure also includes an end user keywords identifier field 820 for containing data indicative of an end user keyword. The data structure also includes an end user video, audio, text and image data identifier field 830 for containing data indicative of end user video, audio, text and image data. The data structure also includes a URI identifier field 840 for containing data indicative of a URI and web data for the web site indicated by the URI, the web data including image, video, text and audio data. The data structure also includes an advertising selection data identifier field 850 for containing data indicative of advertising selection data. The data structure also includes an opt-in contact data for email, text message, VoIP, physical mail address identifier field 860 for containing data indicative of opt-in contact data for email, text message, VoIP, and physical mail address data. In another particular embodiment, the data structure further includes multicast queue data field containing image, video, text and audio data indicating a regional multicast queue of advertising data in a plurality of advertising categories for multicasting to sub groups of end users associated with a regional IPTV server.

The advertising categories presented herein are for illustration only and should not be considered as a limitation as to what advertising categories can be selected. In another particular illustrative embodiment, the advertising categories are representative of the degree of correlation between the video, image, text and audio data in each of the end user profile, multicast queue data and web data, rather than a particular advertising category.

Figure 9:
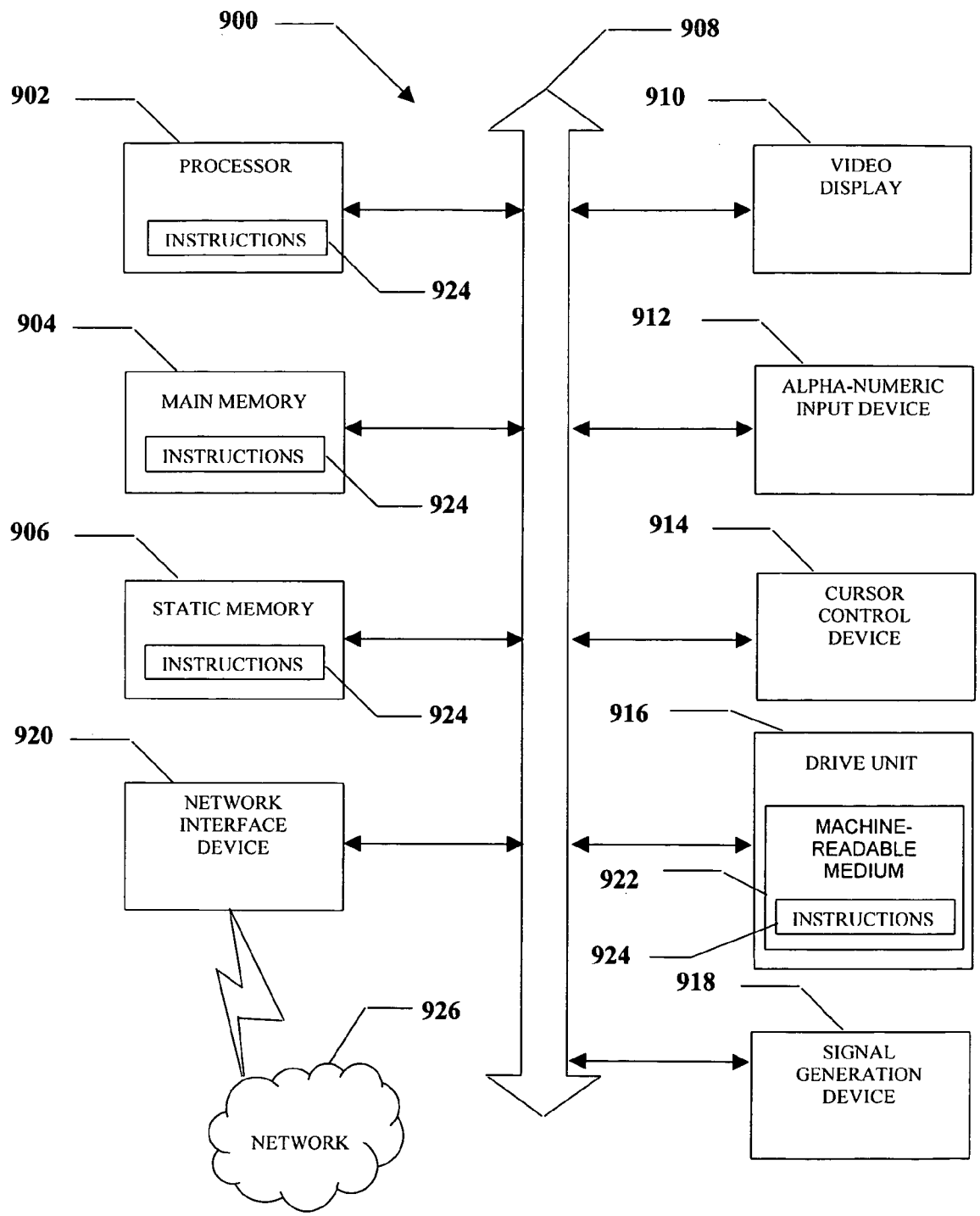
FIG. 9 is another illustrative embodiment of a machine for performing functions disclosed.

FIG. 9 is a diagrammatic representation of a machine in the form of a computer system 900 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (e.g., a central processing unit (CPU), a graphics processing unit (GPU), or both), a main memory 904 and a static memory 906, which communicate with each other via a bus 908. The computer system 900 may further include a video display unit 910 (e.g., liquid crystals display (LCD), a flat panel, a solid state display, or a cathode ray tube (CRT)). The computer system 900 may include an input device 912 (e.g., a keyboard), a cursor control device 914 (e.g., a mouse), a disk drive unit 916, a signal generation device 918 (e.g., a speaker or remote control) and a network interface.

The disk drive unit 916 may include a machine-readable medium 922 on which is stored one or more sets of instructions (e.g., software 924) embodying any one or more of the methodologies or functions described herein, including those methods illustrated in herein above. The instructions 924 may also reside, completely or at least partially, within the main memory 904, the static memory 906, and/or within the processor 902 during execution thereof by the computer system 900. The main memory 904 and the processor 902 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 924, or that which receives and executes instructions 924 from a propagated signal so that a device connected to a network environment 926 can send or receive voice, video or data, and to communicate over the network 926 using the instructions 924. The instructions 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for multicasting targeted advertising data to end user devices, the method comprising:
   tracking at a universal resource indicator server, universal resource indicators comprising domain name world wide web addresses for web sites visited by the end user devices;
   parsing each of the universal resource indicators domain name world wide web addresses visited by the end user devices into one of a noun, an adjective and a verb;
   weighting the parsed one noun, adjective and verb;
   generating a key word from the weighted parsed one noun, adjective and verb;
   selecting the targeted advertising data based on the key word generated; and
   multicasting the targeted advertising data selected to the subgroup of the end user devices from a regional internet protocol television server;
   wherein the universal resource indicators domain name world wide web addresses each comprise at least one of a noun, verb and adjective, the method further comprising: interrogating a web site associated with at least one of the universal resource indicators domain name world wide web addresses to retrieve and store web data from the web site selected from image, video, audio and text;
   correlating the web data with the key word; and
   placing the end user devices in an advertising category based on the correlating; and
   the selecting further comprising: comparing the web data and the advertising data to user profile data for each of the end user devices, wherein the user profile data comprises data indicating the advertising category, wherein the advertising data is selected from a group consisting of the image, text, audio and video data.

2. The method of claim 1, wherein the advertising data in the advertising category is selected from image, text, video and audio data.

3. The method of claim 1, further comprising:
   receiving the targeted advertising data at the regional advertising server from a super regional internet protocol television server, wherein the targeted advertising data further comprises image, video, audio and text data indicating regional advertising data associated with the web data for the regional internet protocol television server.

4. The method of claim 1, further comprising:
   receiving at the regional internet protocol television server, end user selection data indicating a selection of the targeted advertising data multicast to the end user devices;
   accessing contact data associated with the end user selection data; and
   sending a message associated with the targeted advertising data to an end user address in the contact data.

5. The method of claim 4, wherein the end user address is selected from an internet protocol address and a physical address, and wherein the message further comprises data selected from an email, a phone call, a text message and an advertisement mailed to the physical address.

6. The method of claim 1, wherein the advertising category further comprises regional and demographic data sent to the regional internet protocol television server associated with plurality of end users.

7. A system for multicasting targeted advertising data to end user devices, comprising:
   a regional internet protocol television server containing a processor in data communication with a non-transitory computer readable storage medium; and
   a computer program comprising instructions embedded in the non-transitory computer readable medium, the computer program comprising instructions to track at a universal resource indicator server, universal resource indicators tracking at a universal resource indicator server, universal resource indicators comprising domain name world wide web addresses for web sites visited by the end user devices wherein each of the universal resource indicators comprises at least one of a noun, a verb and an adjective;
   instructions to parse each of the universal resource indicators domain name world wide web addresses visited by the end user devices into one of the noun, adjective and verb;
   instructions to weight the parsed indicators to generate weighted and parsed indicators;
   instructions to generate a key word from the weighted and parsed indicators;
   instructions to select the targeted advertising data based on the key word generated;
   instructions to select a subgroup of the end user devices from a plurality of end user devices to receive the targeted advertising data based on correlating the key word with a profile for the end user devices in the subgroup and instructions to multicast the selected targeted advertising data to the subgroup of end user devices from a regional internet protocol television server.

8. The system of claim 7, wherein in the computer program, web data from web sites visited by each of a plurality of end user devices associated with the regional internet protocol television server comprise data selected from image, text, audio and video data, wherein the instructions to correlate further comprise instructions to compare the web data to the targeted advertising data, wherein the instructions to select further comprise instructions to place the end user devices in the subgroup.

9. The system of claim 8, wherein the targeted advertising data is in an advertising category selected from image, text, video and audio data.

10. The system of claim 8, wherein the instructions to select further comprise instructions to compare the web data and advertising data to a user profile for each of the end user devices, wherein the user profile comprises data selected from image, text, audio and video data.

11. The system of claim 7, the computer program further comprising:
    instructions to receive the advertising data at the regional internet protocol television server from a super regional internet protocol television server, wherein the advertising data further comprises advertising tag data comprising image, video, audio and text tag data indicating regional advertising data associated with the regional internet protocol television server.

12. The system of claim 7, the computer program further comprising instructions to receive at the regional internet protocol television server, end user selection data indicating a selection of the targeted advertising data multicast to a plurality of end user devices, instructions to access contact data associated with the end user selection data and instructions to send a message associated with the targeted advertising data to an end user address in the contact data.

13. The system of claim 12, wherein the end user address further comprises data indicative of an end user address selected from an internet protocol address and a physical address, and wherein the message further comprises data selected from an email, a phone call, a text message and an advertisement mailed to a physical address.

14. The system of claim 8, wherein the advertising data further comprises multicast queue data selected from regional location data and demographic data associated with the plurality of end user devices.

15. A tangible non-transitory computer readable storage medium containing computer program of instructions that when executable by a processor perform functions at a regional internet protocol television server, the computer program executable by the processor to multicast targeted advertising data to a plurality of end user devices from the regional internet protocol television server, the computer program comprising instructions to track at a universal resource indicator server, universal resource indicators comprising domain name world wide web addresses for web sites visited by one of the plurality of end user device wherein the universal resource indicator comprises at least one of a noun, verb and adjective;
    instructions to parse each of the universal resource indicators comprising domain name world wide web addresses visited by the end user device into parsed indicators;
    instructions to weight the parsed to generate weighted and parsed indicators;
    instructions to generate a key word from the weighted and parsed indicators;
    instructions to select targeted advertising data based on the key word generated;
    instructions to select a subgroup of the end user devices from the plurality of end user devices to receive the selected targeted advertising data based on correlating the key word with a profile for each of the plurality of end user devices in the subgroup and instructions to multicast the selected targeted advertising data to the subgroup of the end user devices from the regional internet protocol television server.

16. The medium of claim 15, wherein in the computer program, the selected targeted advertising data is advertising data selected from image, text, audio and video data, wherein the instructions to select further comprise instructions to compare the advertising data to the profile for the end user to place each of the plurality of end user devices in a subgroup associated with a member of multicast queue based on the advertising data selected select.

17. A method for receiving multicast targeted advertising data, the method comprising:
    receiving from an internet protocol television regional server, multicast targeted advertising data wherein the multicast targeted advertising data was selected based on a universal resource indicator server tracking universal resource indicators tracked at a universal resource indicator server, universal resource indicators comprising domain name world wide web addresses for web sites visited by a plurality of end user devices, parsed into one of a nouns, adjectives and verb, weights the parsed indicators, generated a key word from the weighted and parsed indicator, selects targeted advertising data based on the key word generated, selected a subgroup of the plurality of end user devices to receive the targeted advertising data based on correlating the key word with a profile for the plurality of end user devices in the subgroup and sends a multicast comprising the selected targeted advertising data to the subgroup of the plurality of end user devices from the regional internet protocol television server.

18. A system for receiving multicast targeted advertising data at an end user device, the system comprising:
    a processor in data communication with a tangible non-transitory computer readable storage medium; and
    a computer program embedded in the non-transitory computer readable storage medium containing instructions that when executed by the processor performs functions, the computer program comprising instructions to receive at the end user device, the multicast targeted advertising data selected based on keywords derived from parsing a universal resource indicator comprising domain name world wide web addresses for web sites visited by the end user device, wherein the universal resource indicator domain name world wide web addresses is at least one of a noun, verb and adjective;
    wherein the universal resource indicators domain name world wide web addresses each comprise at least one of a noun, verb and adjective, the method further comprising: interrogating a web site associated with at least one of the universal resource indicators domain name world wide web addresses to retrieve and store web data from the web site selected from image, video, audio and text;
    correlating the web data with the key word; and
    placing the end user devices in an advertising category based on the correlating; and
    the selecting further comprising: comparing the web data and the advertising data to user profile data for each of the end user devices, wherein the user profile data comprises data indicating the advertising category, wherein the advertising data is selected from a group consisting of the image, text, audio and video data.

19. A data structure embedded in a tangible non-transitory computer readable storage medium, for storing data used by a computer in selecting advertisements, the data structure comprising:
    a first field for containing data indicating universal resource indicators comprising domain name web addresses for web sites visited by a plurality of end user devices; a second field for storing data indicating keywords derived from parsing the universal resource indicators domain name world wide web addresses visited by end user devices into nouns, adjectives and verbs to generate a key word to select targeted advertising data based on the key word;
    wherein the universal resource indicators domain name world wide web addresses each comprise at least one of a noun, verb and adjective, the method further comprising: interrogating a web site associated with at least one of the universal resource indicators domain name world wide web addresses to retrieve and store web data from the web site selected from image, video, audio and text;
    correlating the web data with the key word; and
    placing the end user devices in an advertising category based on the correlating; and
    the selecting further comprising: comparing the web data and the advertising data to user profile data for each of the end user devices, wherein the user profile data comprises data indicating the advertising category, wherein the advertising data is selected from a group consisting of the image, text, audio and video data.

20. The data structure of claim 19, further comprising:
a third field for containing data indicating a contact address for an end user device for sending a message to the end user device at a contact address, wherein the contact address further comprises data selected from an internet protocol address and a physical address.

* * * * *